US012729659B2

(12) United States Patent
Wang et al.

(10) Patent No.: US 12,729,659 B2
(45) Date of Patent: Sep. 8, 2026

(54) PUSHER AIRCRAFT POWER PLANT WITH SWIRL RECOVERY VANES

(71) Applicant: PRATT & WHITNEY CANADA CORP., Longueuil (CA)

(72) Inventors: Xi Wang, Montréal (CA); Jean Thomassin, Ste-Julie (CA); Michael Lanktree, La Prairie (CA); Pierre Bertrand, St-Patrice-de-Sherrington (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/948,742

(22) Filed: Nov. 15, 2024

(65) Prior Publication Data

US 2026/0194029 A1 Jul. 9, 2026

(51) Int. Cl.
*F02K 3/062* (2006.01)
*B64C 11/00* (2006.01)
(Continued)

(52) U.S. Cl.
CPC .............. *F02K 3/062* (2013.01); *B64C 11/00* (2013.01); *B64D 27/026* (2024.01);
(Continued)

(58) Field of Classification Search
CPC ....... F02K 3/062; B64C 11/00; B64D 27/026; B64D 2027/005; F02C 6/20; F05D 2230/70
See application file for complete search history.

(56) References Cited

U.S. PATENT DOCUMENTS 3,687,569 A * 8/1972 Klompas ............... F04D 29/323 416/207
3,811,791 A * 5/1974 Cotton ...................... F02C 3/10 416/129
(Continued)

FOREIGN PATENT DOCUMENTS

CA 2943469 C 11/2019
FR 3125797 A1 2/2023
(Continued)

OTHER PUBLICATIONS

Propeller Aerodynamics, Counter & Contra-rotating Props, Feb. 7, 2016, heli-air.net/2016/02/07/counter-amp-contra-rotating-props/, accessed on Oct. 15, 2024.
(Continued)

*Primary Examiner* — William H Rodriguez
(74) *Attorney, Agent, or Firm* — Norton Rose Fulbright Canada LLP

(57) ABSTRACT

A pusher aircraft power plant for propelling an aircraft is described. The pusher aircraft power plant is configured to improve serviceability of swirl recovery vanes. The pusher aircraft power plant includes a prime mover operable to generate motive power, an enclosure housing at least part of the prime mover, a bladed rotor drivingly coupled to the prime mover and disposed aft of the prime mover, and a plurality of vanes angularly distributed about a rotation axis of the bladed rotor and being non-rotatable about the rotation axis of the bladed rotor. The vanes are disposed aft of the bladed rotor to interact with a flow of air propelled by the bladed rotor during rotation of the bladed rotor. The vanes are disposed aft of the enclosure permitting the vanes to be uninstalled from the pusher aircraft power plant without accessing the enclosure.

15 Claims, 7 Drawing Sheets

(51) Int. Cl.

| | |
|---|---|
| ***B64D 27/02*** | (2006.01) |
| *B64D 27/00* | (2006.01) |
| *F02C 6/20* | (2006.01) |

(52) U.S. Cl.
CPC .......... *B64D 2027/005* (2013.01); *F02C 6/20* (2013.01); *F05D 2230/70* (2013.01)

(56) References Cited

U.S. PATENT DOCUMENTS

| | | | | |
|---|---|---|---|---|
| 3,870,434 | A * | 3/1975 | Paulson | F01D 7/00 416/162 |
| 4,222,234 | A * | 9/1980 | Adamson | F02K 3/065 244/54 |
| 4,676,459 | A | 6/1987 | Seefluth | |
| 5,054,998 | A * | 10/1991 | Davenport | B64D 33/04 416/129 |
| 5,079,916 | A * | 1/1992 | Johnson | F02K 3/072 416/129 |
| 5,242,265 | A * | 9/1993 | Hora | B64C 11/32 416/129 |
| 8,294,316 | B2 * | 10/2012 | Blackwelder | B64D 15/12 310/212 |
| 8,371,105 | B2 * | 2/2013 | Glynn | F01D 7/00 60/268 |
| 8,690,106 | B1 * | 4/2014 | Reissig | B64D 29/04 244/208 |
| 8,845,270 | B2 * | 9/2014 | Nordstrom | B64C 11/02 415/140 |
| 10,017,270 | B2 | 7/2018 | Becker et al. | |
| 10,400,632 | B2 * | 9/2019 | Beutin | B64D 27/16 |
| 11,391,298 | B2 | 7/2022 | Miller et al. | |
| 12,203,385 | B1 * | 1/2025 | Morton | B64C 11/00 |
| 12,448,901 | B1 * | 10/2025 | Breault | B64C 11/20 |
| 2011/0171030 | A1 * | 7/2011 | Swift | F02C 9/58 416/159 |
| 2011/0259996 | A1 * | 10/2011 | Vetters | B64D 27/406 244/54 |
| 2012/0000177 | A1 * | 1/2012 | Vuillemin | B64C 11/308 60/39.162 |
| 2013/0098066 | A1 * | 4/2013 | Gallet | F02K 3/072 60/796 |
| 2014/0099205 | A1 * | 4/2014 | Tajan | F01D 5/3007 416/95 |
| 2014/0186182 | A1 * | 7/2014 | Gallet | B64C 11/38 416/147 |
| 2014/0322016 | A1 * | 10/2014 | Tajan | B64C 11/32 416/147 |
| 2014/0374566 | A1 * | 12/2014 | Fernando | B64D 27/402 248/554 |
| 2015/0217854 | A1 * | 8/2015 | Duffet | F02C 3/067 416/129 |
| 2015/0219014 | A1 * | 8/2015 | Belmonte | F02C 7/24 415/68 |
| 2015/0284071 | A1 * | 10/2015 | Veilleux, Jr. | B64D 35/024 244/62 |
| 2015/0336679 | A1 * | 11/2015 | Tajan | B64C 11/38 415/130 |
| 2015/0344127 | A1 * | 12/2015 | Wood | B64C 11/18 415/119 |
| 2016/0264233 | A1 * | 9/2016 | Pautis | B64C 7/02 |
| 2017/0190433 | A1 * | 7/2017 | Monton | B64C 11/306 |
| 2017/0292523 | A1 * | 10/2017 | Niergarth | F04D 25/06 |
| 2017/0313404 | A1 * | 11/2017 | Colmagro | B64C 11/30 |
| 2018/0138766 | A1 * | 5/2018 | Moore | B64D 27/34 |
| 2019/0002086 | A1 * | 1/2019 | Tweedt | B64C 11/18 |
| 2020/0309066 | A1 * | 10/2020 | Ross | B64C 27/26 |
| 2021/0270209 | A1 * | 9/2021 | Brandstein | F02C 3/04 |
| 2023/0085244 | A1 * | 3/2023 | Miller | F02C 6/206 415/68 |
| 2024/0017841 | A1 | 1/2024 | Freer | |
| 2024/0017842 | A1 | 1/2024 | Freer | |
| 2024/0017847 | A1 | 1/2024 | Freer | |
| 2024/0092491 | A1 | 3/2024 | Dussault | |
| 2024/0317386 | A1 * | 9/2024 | Jodet | F01D 5/02 |
| 2025/0197014 | A1 * | 6/2025 | Gea Aguilera | F02C 9/20 |
| 2025/0250020 | A1 * | 8/2025 | Morton | F02C 7/04 |
| 2025/0326484 | A1 * | 10/2025 | Gea Aguilera | B64C 11/20 |

FOREIGN PATENT DOCUMENTS

| | | | | |
|---|---|---|---|---|
| GB | 588096 | A | 5/1947 | |
| WO | WO-2023007098 | A1 * | 2/2023 | F01D 5/14 |
| WO | 2023170357 | A1 | 9/2023 | |

OTHER PUBLICATIONS

Wikipedia, Antonov An-70, https://en.wikipedia.org/wiki/Antonov_An-70#, accessed on Oct. 15, 2024.

Wikipedia, Pratt & Whitney/Allison 578-DX, https://en.wikipedia.org/wiki/Pratt_%26_Whitney/Allison_578-DX, accessed on Oct. 15, 2024.

Mary L. Dudy, How RISE Arose: The Story Behind Decades of Innovations That Bring CFM to a Pivotal Moment, Jun. 18, 2023, Rise Program/GE News, https://www.ge.com/news/taxonomy/term/9159, accessed on Oct. 15, 2024.

Jon Hemmerdinger, GE Aviation to become GE Aerospace, reflecting expansion plan, FlightGlobal, Jul. 18, 2022, https://www.flightglobal.com/farnborough-2022/ge-aviation-to-become-ge-aerospace-reflecting-expansion-plan/149442.article, accessed on Oct. 15, 2024.

FREE3D, Embraer Fma 123 Cba Vector 3D Model, (https://srv.carbonads.net/ads/click/x/GTND427LF6YD6K37 ADS Via Carbon (HT TP://CARBONADUTM_SOURCE=FREE3DCOM&UTM_MED, accessed on Oct. 15, 2024.

Ebay, Garrett TPF351-20 Turboprop Aero Engine Brochure Regional Airliner, Jun. 1990, https://www.ebay.ca/itm/295802734476, accessed on Oct. 15, 2024.

Flightglobal, Garrett TPF351-20 Cutaway Drawing, https://www.flightglobalimages.com/cutaways/aeroengines-piston-cutaways/garrett-tpf351-20-cutaway-drawing-1569881.html, accessed on Oct. 15, 2024.

The Avio Aero People's Magazine, Together We Rise, Aug. 2021, https://magazineabout.com/future/together-we-rise, accessed on Oct. 15, 2024.

Anonymous, Unique "Grim's Vane Wheel" Propulsion System on the Siem Curie, Jan. 20, 2020, https://siemshipmanagement.pl/content_news/unique-grims-vane-wheel-system-the-siem-curie, accessed Oct. 16, 2024.

Joel N., Constant Speed Propellers Explained, Nov. 9, 2020, https://www.century-of-flight.net/constant-peed-propellers-explained/, accessed on Nov. 13, 2024.

Van Den Ende Luc, Swirl Recovery Vanes for Propeller Propulsion Systems, Oct. 31, 2018, pp. 1-91, XP093368192, Retrieved from the Internet: URL:https://scispace.com/pdf/swirl-recovery-vanes-for-propeller-propulsion-systems-an-2s20q00480.pdf, [retrieved on Feb. 1, 2026.

European Patent Office, Communication re: extended European search report dated Mar. 2, 2026 re: European Patent Application No. 25216433.0.

* cited by examiner

RA
24
22
VA
18
P2
22
18
BA
P1
26
20
16
18
R
12,14
10
FORWARD
AFT

Aircraft
Wankel Engine(s)
112
Airframe
AIR
EXHAUST GAS
FORWARD
AFT
110
16
18
22
RA
44
36
42
46
48
38
32
OA
34
40
126
114
150
30
128

P2
VA
22
RA
62
22
44
BA
P1
16
18
36
42
46
48
18
PITCH ACTUATOR(S)
60
FORWARD
AFT

RA
R
64
C
36
66
48
42

22
Vane
22
Vane
62
18
Blade
18
Blade
16
64
44
36
42
RA
48
38
FORWARD
AFT

PUSHER AIRCRAFT POWER PLANT WITH SWIRL RECOVERY VANES

TECHNICAL FIELD

The disclosure relates generally to aircraft power plants, and more particularly to aircraft power plants having a pusher configuration.

BACKGROUND

An aircraft power plant having a pusher configuration typically has an engine and propulsion device (e.g., propeller) that is driven by the engine and that is disposed aft of the engine relative to the direction in which the aircraft is propelled. The pusher configuration can provide aerodynamic benefits in some installations. The propulsive efficiency of an aircraft power plant with a pusher configuration can be improved through the use of contra-rotating propellers but such configuration is typically not used on commercial aircraft due the high level of noise. Improvement is desirable.

SUMMARY

In one aspect, the disclosure describes a pusher aircraft power plant for propelling an aircraft. The pusher aircraft power plant comprises:

- a prime mover operable to generate motive power;
- an enclosure housing at least part of the prime mover;
- a bladed rotor drivingly coupled to the prime mover and disposed aft of the prime mover relative to a direction of propulsion of the pusher aircraft power plant; and
- a plurality of vanes angularly distributed about a rotation axis of the bladed rotor and being non-rotatable about the rotation axis of the bladed rotor, the vanes being disposed aft of the bladed rotor to interact with a flow of air propelled by the bladed rotor during rotation of the bladed rotor, the vanes being disposed aft of the enclosure housing at least part of the prime mover.

The enclosure may include a nacelle and the vanes may be disposed aft of the nacelle.

The prime mover may include a combustion engine having an exhaust gas outlet. The vanes may be disposed aft of the exhaust gas outlet.

The prime mover may include one or more turbines. The bladed rotor may be disposed aft of all of the one or more turbines.

The prime mover may be drivingly connected to an output shaft for delivering the motive power to the bladed rotor. The output shaft has an aft end that is disposed outside and aft of the enclosure of the prime mover.

The bladed rotor may be mounted to a rotor shaft rotatable about the rotation axis of the bladed rotor. The output shaft and the rotor shaft may be non-coaxial.

The rotor shaft may be radially offset from the output shaft.

The rotor shaft may be drivingly coupled to the output shaft via gears housed inside a gearbox.

The bladed rotor may be mounted to a hollow rotor shaft rotatable about the rotation axis of the bladed rotor. The bladed rotor may be drivingly coupled to the prime mover via the hollow rotor shaft. The vanes may be mounted to a non-rotatable vane shaft that extends into the hollow rotor shaft.

The hollow rotor shaft may be drivingly coupled to the prime mover via gears housed inside a gearbox. The non-rotatable vane shaft may be fixedly secured to a non-rotating structure inside of the gearbox.

The bladed rotor and the vanes may be open.

The vanes may have a variable pitch.

The prime mover may include a Wankel engine.

The prime mover may include a gas turbine engine having a turbine section. The vanes may be disposed aft of the turbine section.

Embodiments may include combinations of the above features.

In another aspect, the disclosure describes a pusher aircraft power plant for propelling an aircraft. The pusher aircraft power plant comprises:

- a combustion engine operable to generate motive power, the combustion engine having a housing;
- a bladed rotor for propelling the aircraft, the bladed rotor being drivingly coupled to the combustion engine and disposed aft of the housing of the combustion engine relative to a direction of propulsion of the pusher aircraft power plant; and
- a circular array of swirl-recovery vanes coaxial with a rotation axis of the bladed rotor and non-rotatable about the rotation axis of the bladed rotor, the swirl-recovery vanes being disposed aft of the bladed rotor to interact with a flow of air exiting the bladed rotor during rotation of the bladed rotor.

The combustion engine may have an output shaft. The bladed rotor may be mounted to a hollow rotor shaft rotatable about the rotation axis of the bladed rotor. The hollow rotor shaft may be radially offset from the output shaft.

The swirl-recovery vanes may be mounted to a non-rotatable vane shaft that extends through the hollow rotor shaft and that is fixedly secured at a location that is forward of the hollow rotor shaft.

The combustion engine may be a Wankel engine.

Embodiments may include combinations of the above features.

In a further aspect, the disclosure describes a method of servicing a pusher aircraft power plant having a prime mover, an enclosure housing at least part of the prime mover, a bladed rotor drivingly coupled to the prime mover and disposed aft of the prime mover, and a plurality of swirl recovery vanes disposed aft of the bladed rotor to interact with a flow of air exiting the bladed rotor during rotation of the bladed rotor. The method comprises uninstalling the swirl recovery vanes from the pusher aircraft power plant without accessing the enclosure of the prime mover.

The prime mover may include a combustion engine. The method may include uninstalling the bladed rotor from the pusher aircraft power plant without accessing the enclosure of the prime mover.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The present disclosure describes pusher aircraft power plants and methods of servicing such pusher aircraft power plants. In some embodiments, the pusher aircraft power plants described herein may include swirl recovery vanes to improve propulsive efficiency without significantly increasing propeller noise. In some embodiments, the configuration of the swirl recovery vanes in a pusher configuration as described herein may facilitate servicing of the pusher aircraft power plant by facilitating the removal, installation and/or replacement of the swirl recovery vanes as a line replaceable unit (LRU) that does not require extensive disassembly of the remainder of the pusher aircraft power plant. For example, the configuration of the swirl recovery vanes described herein may facilitate the removal, installation and/or replacement of the swirl-recovery vanes without needing to access an enclosure of a prime mover (e.g., combustion engine, electric motor) of the pusher aircraft power plant.

Aspects of various embodiments are described through reference to the drawings. The terms "coupled" and "secured" may respectively include both direct coupling and securing (in which two elements contact each other) and indirect coupling and securing (in which at least one additional element is located between the two elements). The term "substantially" as used herein may be applied to modify any quantitative representation which could permissibly vary without resulting in a change in the basic function to which it is related. As used herein, the singular forms "a," "an," and "the" are intended to include the plural forms as well, unless the context clearly indicates otherwise.

Figure 1:
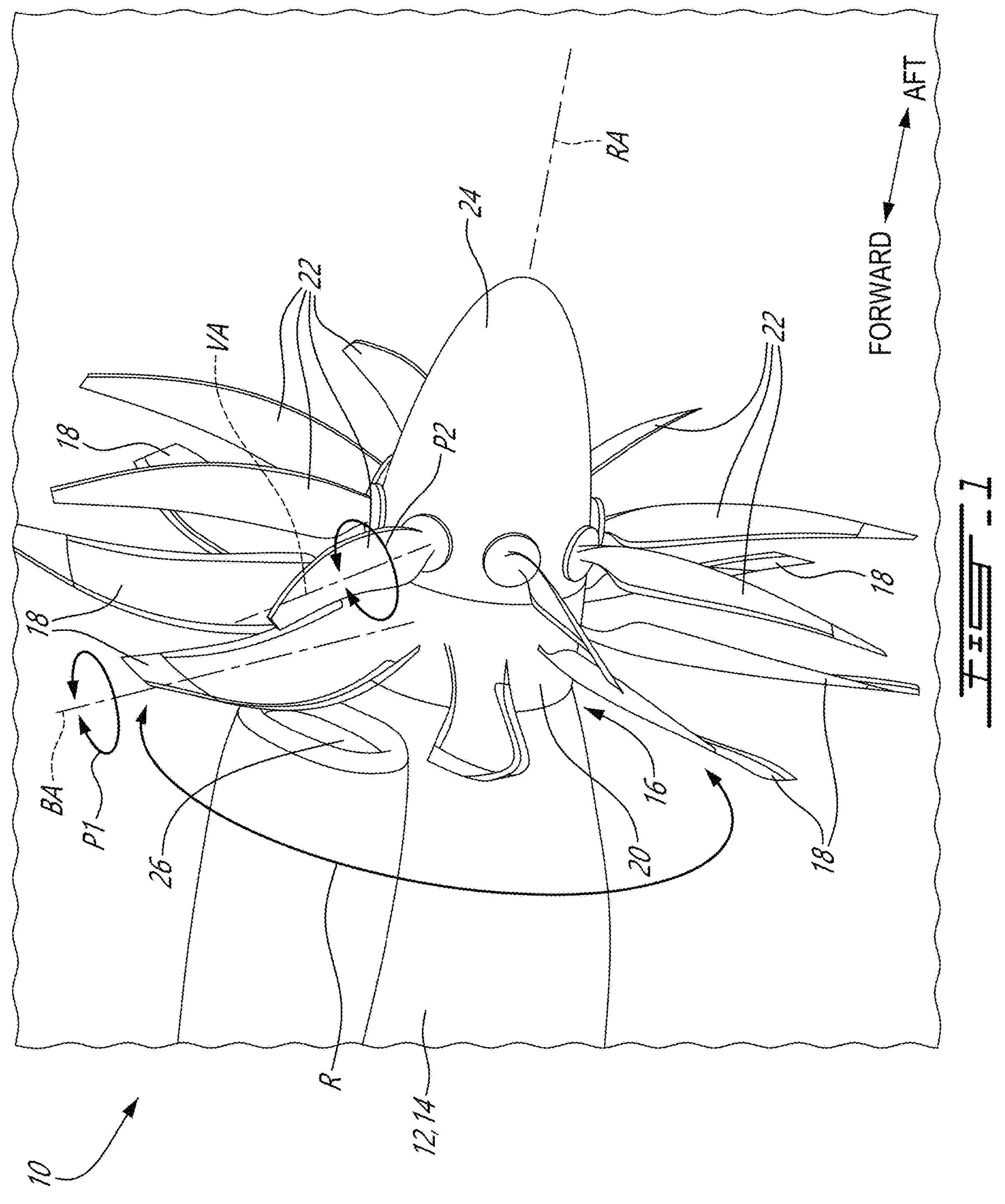
FIG. 1 is a perspective view of part of a pusher aircraft power plant.

FIG. 1 is a perspective view of part of a pusher aircraft power plant 10 (referred hereinafter as "power plant 10") having a pusher configuration. Power plant 10 may include prime mover 12 operable to generate motive power. Prime mover 12 may include a machine that converts one form of energy into motive power. In various embodiments, prime mover 12 may include a (e.g., continuous or intermittent) combustion engine, and/or an electric motor. Prime mover 12 may be partially or entirely housed inside enclosure 14, which may be a streamlined container (e.g., nacelle) that is configured to interact with a flow of ambient air outside of power plant 10 during operation of power plant 10.

Power plant 10 may include bladed rotor 16 drivingly coupled to and driven by prime mover 12. Bladed rotor 16 may be disposed aft of prime mover 12 relative to a direction of propulsion of power plant 10. Bladed rotor 16 may be disposed aft of enclosure 14. The general direction of propulsion is labeled as "FORWARD" in FIG. 1 and the opposite direction is labeled as "AFT" in FIG. 1. Bladed rotor 16 may include a plurality of rotor blades 18 that are angularly distributed about hub 20 and also secured to hub 20. Rotor blades 18 and hub 20 may be rotatable together about rotor axis RA in the direction of arrow R. Rotor axis RA may correspond to a rotation axis of bladed rotor 16. In various embodiments, rotor blades 18 may have a fixed pitch or a variable pitch. For example, each rotor blade 18 may have a respective blade axis BA (only one instance being shown in FIG. 1 for clarity) oriented radially relative to rotor axis RA so that each rotor blade 18 may be controllably rotatable about its blade axis BA in the direction of arrow P1 to vary its pitch for example. In various embodiments, bladed rotor 16 may be ducted or open (i.e., unducted, unshrouded). For example, bladed rotor 16 may be a ducted fan or a propfan. In some embodiments, bladed rotor 16 may be a (e.g., variable-pitch) propeller.

Power plant 10 may include a plurality of swirl recovery vanes 22 (referred hereinafter as "vanes 22") angularly distributed about rotation axis RA of bladed rotor 16. In other words, vanes 22 may be arranged in a circular array that is coaxial with rotation axis RA of bladed rotor 16. Vanes 22 may be non-rotatable (i.e., fixed) about rotation axis RA of bladed rotor 16. Vanes 22 may be disposed aft of bladed rotor 16 and axially adjacent to bladed rotor 16 so that vanes 22 may interact with a flow of air propelled by (i.e., exiting) bladed rotor 16 during rotation of bladed rotor 16. Vanes 22 may be configured and positioned so that, during rotation of bladed rotor 16, vanes 22 may improve the propulsive efficiency by recovering some of the swirl in the slipstream of bladed rotor 16. In other words, vanes 22 may convert rotational kinetic energy in the slipstream of bladed rotor 16 into axial velocity toward the AFT direction to increase the thrust and efficiency of bladed rotor 16. For example, in some embodiments, the presence of vanes 22 may allow a higher thrust rating to be achieved for bladed rotor 16 of a particular size. In other words, the presence of vanes 22 may allow the thrust rating of bladed rotor 16 to be increased and be equivalent to a thrust rating of a single bladed rotor of a larger diameter.

In various embodiments, vanes 22 may have a fixed pitch or a variable pitch. For example, each vane 22 may have a respective vane axis VA (only one instance being shown in FIG. 1 for clarity) oriented radially relative to rotor axis RA so that each vane 22 may be controllably rotatable about its vane axis VA in the direction of arrow P2 to vary its pitch for example. In various embodiments, vanes 22 may be ducted or open (i.e., unducted, unshrouded).

In some embodiments, power plant 10 may include aftbody 24 that is disposed aft of vanes 22. Aftbody 24 may be a streamlined fairing fitted over a hub of the array of vanes 22 and coaxial with rotor axis RA. In some embodiments, aftbody 24 may be non-rotatable about rotor axis RA.

In embodiments where prime mover 12 includes a combustion engine, power plant 10 may include an exhaust passage that extends through enclosure 14 and that leads to exhaust outlet 26, which discharges exhaust gas into the ambient environment. Exhaust outlet 26 may be disposed forward of bladed rotor 16 and may be oriented to discharge the exhaust gas in the AFT direction. In some embodiments, the exhaust gas that is discharged from exhaust outlet 26 may pas through bladed rotor 16 so as to interact with rotor blades 18 and also interact with one or more vanes 22. In other words, bladed rotor 16 may be disposed aft of exhaust outlet 26. Vanes 22 may also be disposed aft of exhaust outlet 26. Vanes 22 may be disposed aft of prime mover 12 and also aft of enclosure 14, which may be a nacelle.

Figure 2:
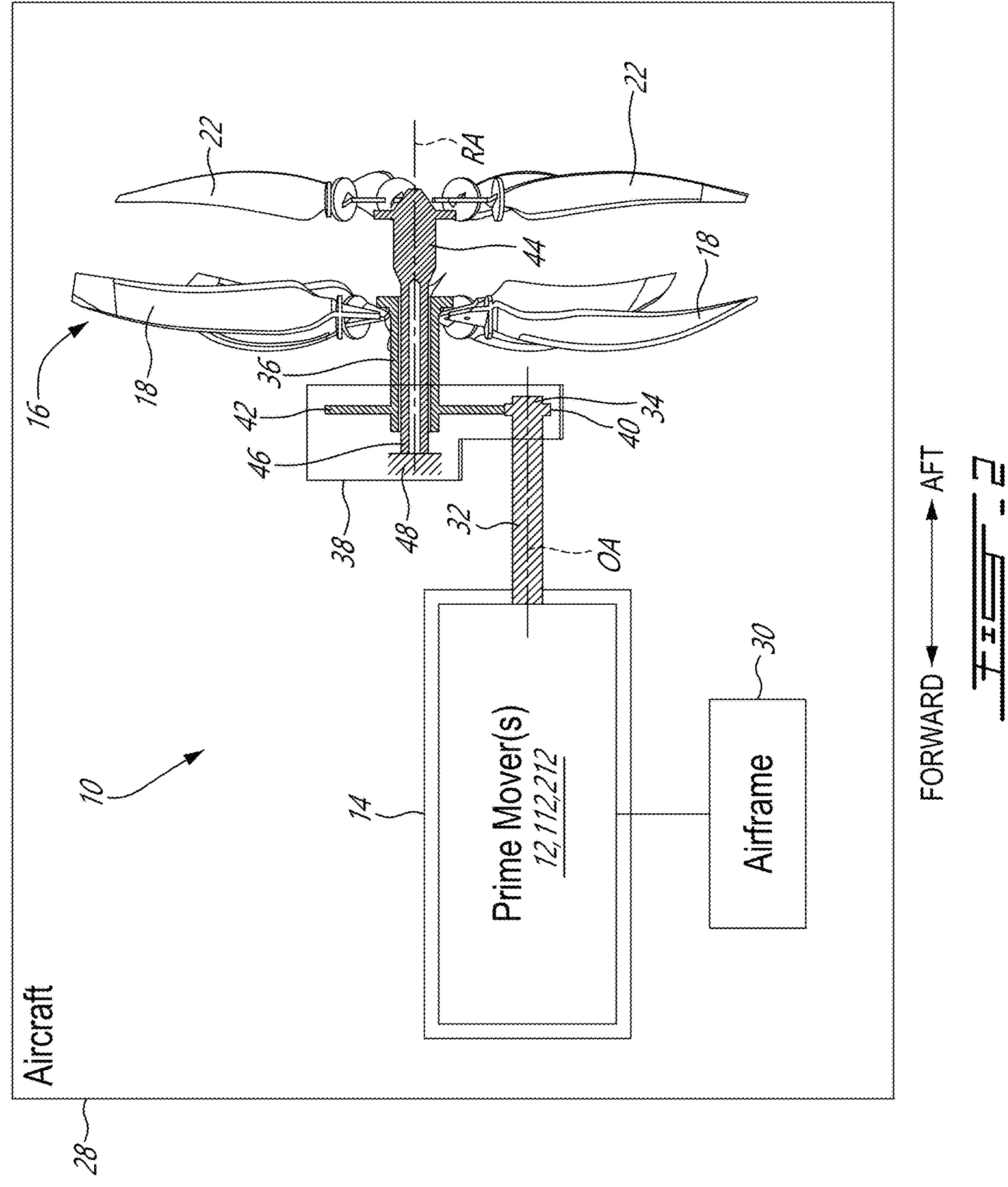
FIG. 2 is a schematic view of an exemplary configuration of the pusher aircraft power plant of FIG. 1.

FIG. 2 is a schematic view of an exemplary configuration of power plant 10 integrated in aircraft 28 (shown schematically). FIG. 2 includes an axial cross-sectional view through bladed rotor 16 and through a circular array of vanes 22. Aircraft 28 may be any type of manned or unmanned aircraft (e.g., drones) such as corporate, private, commercial and passenger aircraft. In some embodiments, aircraft 28 may be a fixed-wing aircraft including one or more power plants 10 mounted thereto for propelling aircraft 28. Aircraft 28 may include airframe 30 to which prime mover 12 may be mounted via suitable structure such as a pylon for example. In various embodiments of aircraft 28, power plant 10 may be mounted to and supported by a fuselage or to a wing of aircraft 28.

Prime mover 12 may include or be drivingly connected to output shaft 32 for delivering the motive power to bladed rotor 16. Output shaft 32 may extend through enclosure 14 and out of enclosure 14 in the AFT direction. For example, output shaft 32 may have aft end 34 thereof that is disposed out of enclosure 14 and aft of enclosure 14. Output shaft 32 may be rotatable about output axis OA.

Bladed rotor 16 may be mounted (e.g., fastened) to rotor shaft 36 (e.g., propeller shaft) rotatable about rotor axis RA. Accordingly, bladed rotor 16 may rotate with rotor shaft 36. Output shaft 32 and rotor shaft 36 may be non-coaxial. In some embodiments, output axis OA and rotor axis RA may be substantially parallel but spaced apart from each other. For example, rotor shaft 36 may be radially offset from output shaft 32.

Output shaft 32 may be in torque-transmitting engagement with rotor shaft 36 via optional gearbox 38. In some embodiments, gearbox 38 may provide a speed reduction function so that rotor shaft 36 may rotate at a slower rotational speed than output shaft 32. In other words, gearbox 38 may be a speed reduction gearbox in some embodiments. Aft end 34 of output shaft 32 may extend into gearbox 38. For example, rotor shaft 36 may be drivingly coupled to output shaft 32 via first (e.g., smaller) gear 40 being meshed with second (e.g., larger) gear 42. First gear 40 may be driven by output shaft 32, be substantially coaxial therewith and also be rotatable therewith. First gear 40 may be mounted to output shaft 32. Second gear 42 may drive rotor shaft 36, be substantially coaxial therewith and also be rotatable therewith. Second gear 42 may be mounted to rotor shaft 36. In some embodiments, first gear 40 may have a smaller diameter and have fewer teeth than larger second gear 42 in order to provide a speed reduction. First gear 40 and second gear 42 may be housed inside of gearbox 38. In various embodiments, gearbox 38 may include additional gears and have a different configuration than that disclosed herein.

Rotor shaft 36 may be hollow and may define a central passage extending axially therethrough. Vanes 22 may be mounted (e.g., fastened) to non-rotatable vane shaft 44 that extends into the central passage of rotor shaft 36. Vane shaft 44 may be sized to fit inside the central passage of rotor shaft 36. Vane shaft 44 may be substantially coaxial with rotor shaft 36 and may be extend completely though rotor shaft 36. Vane shaft 44 may extend axially though second gear 42. Forward end 46 of vane shaft 44 may extend into gearbox 38 may be fixedly secured (e.g., fastened) to non-rotating structure 48 inside of gearbox 38. Non-rotating structure 48 may be a wall of gearbox 38 or another suitable mounting interface. Non-rotating structure 48 may be outside of gearbox 38. Non-rotating structure 48 may be part of enclosure 14. Vane shaft 44 may be fixedly secured at a location that is forward of rotor shaft 36.

Figure 3:
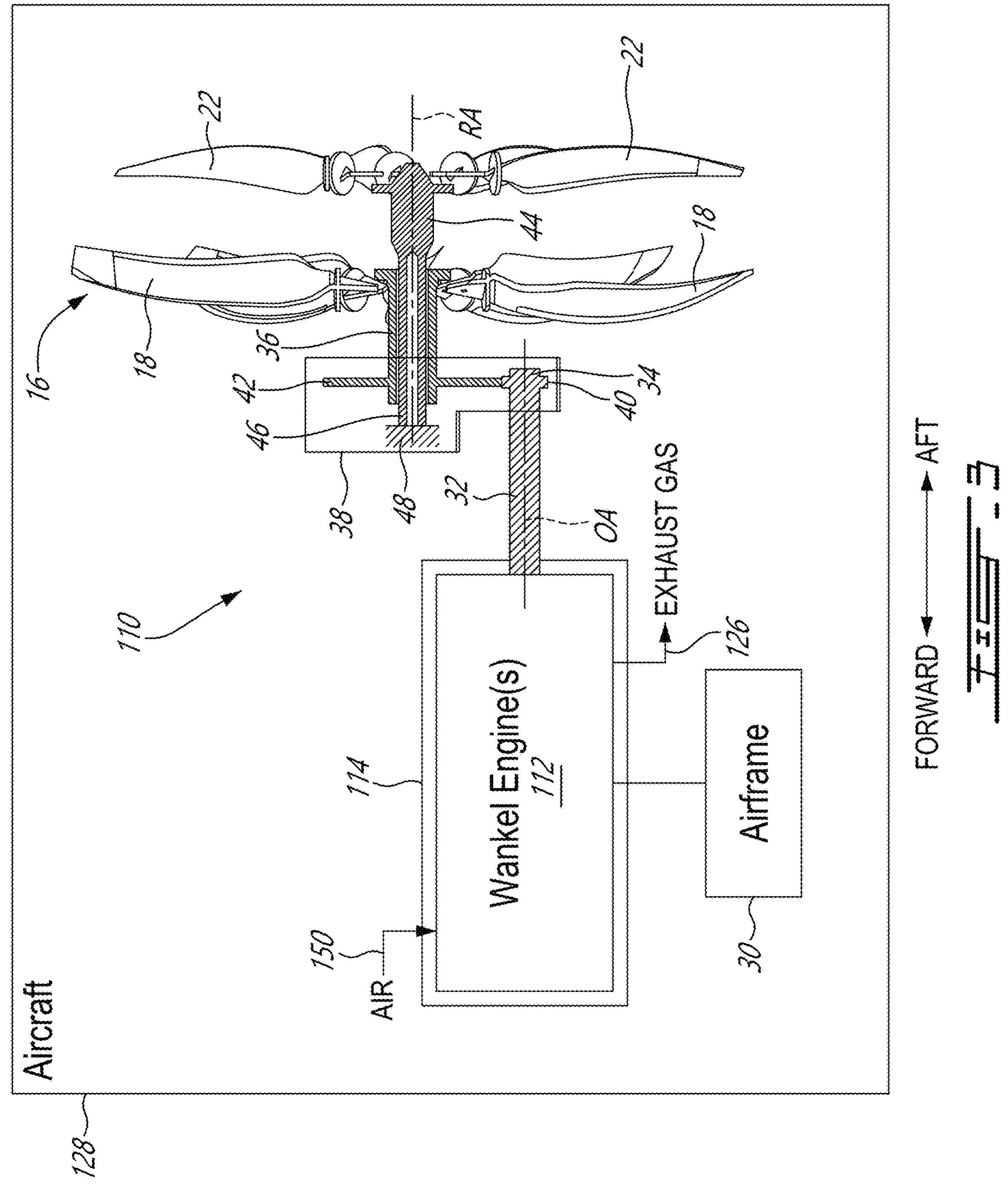
FIG. 3 is a schematic view of another exemplary configuration of the pusher aircraft power plant of FIG. 1.

FIG. 3 is a schematic view of another exemplary configuration of pusher aircraft power plant 110 (referred hereinafter as "power plant 110"). FIG. 3 includes an axial cross-sectional view through bladed rotor 16 and through the circular array of vanes 22. Power plant 110 may be operatively mounted to propel aircraft 128. Power plant 110 may include elements of power plant 10 previously described above and like elements are identified using like reference numerals. For example, the pusher configuration of bladed rotor 16 and vanes 22 may be similar or substantially identical to that of power plant 10. Bladed rotor 16 may be drivingly coupled to output shaft 32 via gearbox 38.

The prime mover of power plant 110 may include a combustion engine such as an internal combustion engine operable to generate motive power. For example, power plant 110 may include an intermittent combustion engine such as a piston engine or a pistonless rotary engine. As shown in FIG. 3, power plant 110 may include Wankel engine 112 for example. Wankel engine 112 may drive output shaft 32, which may in turn drive rotor shaft 36 and bladed rotor 16.

Wankel engine 112 may be partially or entirely housed in enclosure 114 (e.g., engine casing and/or engine nacelle). Enclosure 114 may include air inlet 150 for receiving ambient air therein to support the combustion process. Enclosure 114 may include exhaust outlet 126 for releasing exhaust gas to the ambient environment. Bladed rotor 16 and vanes 22 may be disposed aft of enclosure 114. Bladed rotor 16 and vanes 22 may be disposed aft of exhaust outlet 126.

In some embodiments, power plant 110 may include a compound cycle engine of a type described in U.S. Pat. No. 10,107,195 (Title: COMPOUND CYCLE ENGINE), which is incorporated by reference herein. Such compound cycle engine may be used to drive output shaft 32. Wankel engine 112 may be integrated into such compound cycle engine. In some embodiments, power plant 110 may include Wankel engine 112 integrated (i.e., combined) with one or more elements of the power plant of U.S. Pat. No. 11,866,181 (title: AIRCRAFT POWER PLANT), which is incorporated by reference herein. Wankel engine 112 may operate on a suitable fuel and air. In some embodiments, the fuel may be a mixture of relatively heavy fuel (e.g. diesel, kerosene (jet fuel) and suitable biofuel).

Figure 4:
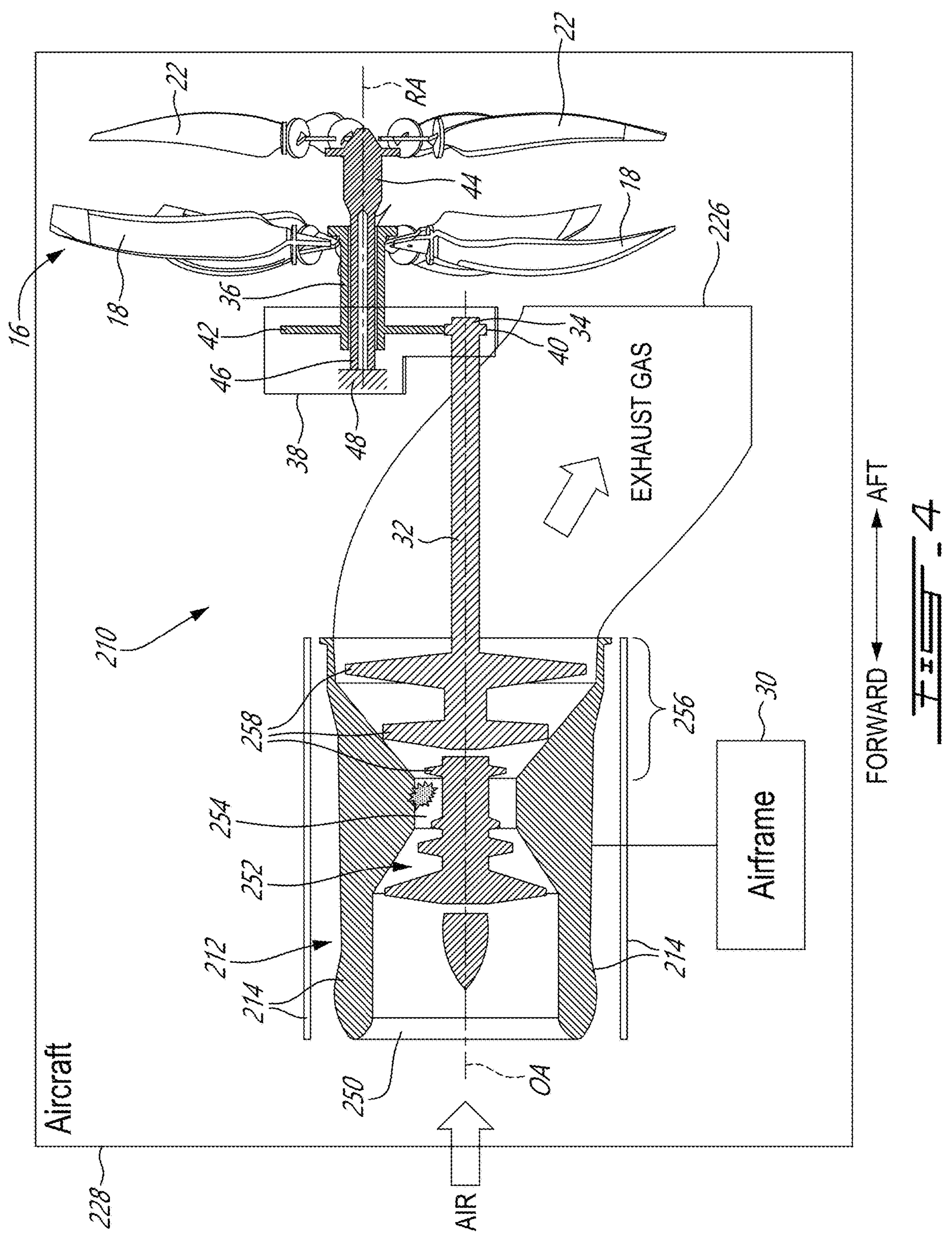
FIG. 4 is a schematic axial cross-sectional view through another exemplary configuration of the pusher aircraft power plant of FIG. 1.

FIG. 4 is a schematic axial cross-sectional view through another exemplary configuration of pusher aircraft power plant 210 (referred hereinafter as "power plant 210"). FIG. 4 includes an axial cross-sectional view through bladed rotor 16 and through the circular array of vanes 22. Power plant 210 may be operatively mounted to propel aircraft 228. Power plant 210 may include elements of power plants 10, 110 previously described above and like elements are identified using like reference numerals. For example, the pusher configuration of bladed rotor 16 and vanes 22 may be similar or substantially identical to that of power plants 10, 110. Bladed rotor 16 may be drivingly coupled to output shaft 32 via gearbox 38.

The prime mover of power plant 210 may include a continuous combustion engine such as gas turbine engine 212 to generate motive power. Gas turbine engine 212 may drive output shaft 32, which may in turn drive rotor shaft 36 and bladed rotor 16. Gas turbine engine 212 may generally include in serial flow communication, air inlet 250 for receiving ambient air, multistage compressor 252 for pressurizing the air, combustor 254 in which the pressurized air is mixed with fuel and ignited for generating an annular stream of hot combustion gas, and turbine section 256 for extracting energy from the combustion gas. Turbine section 256 may include one or more turbines 258. Gas turbine engine 212 may be partially or entirely housed in enclosure 214 (e.g., engine casing and/or engine nacelle). Enclosure 214 may define air inlet 250 for receiving ambient air therein to support the combustion process. Enclosure 214 may include exhaust outlet 226 for releasing exhaust gas to the ambient environment.

Bladed rotor 16 and vanes 22 may be disposed aft of enclosure 214. Bladed rotor 16 and vanes 22 may be disposed aft of exhaust outlet 226. Bladed rotor 16 and vanes 22 may be disposed aft of turbine section 256. Bladed rotor 16 and vanes 22 may be disposed aft of all of turbines 258. Bladed rotor 16 and vanes 22 may be disposed aft of an aft-most turbine 258 of gas turbine engine 212.

Figures 5, 5A:
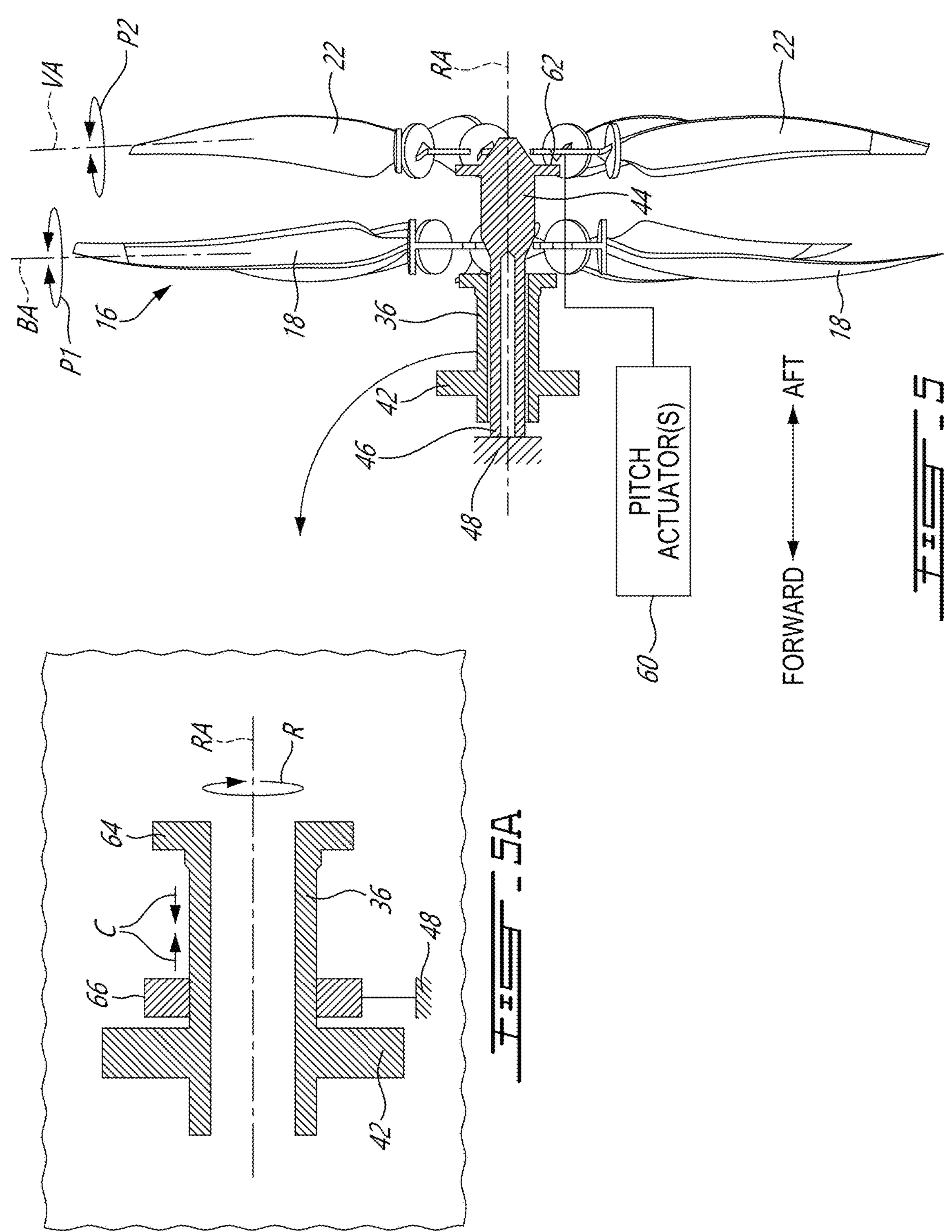
FIG. 5 is a schematic axial cross-sectional view through a bladed rotor and an array of swirl recovery vanes of the pusher aircraft power plant.
FIG. 5A is an enlarged cross-sectional view of a rotor shaft of the pusher aircraft power plant.

FIG. 5 is a schematic axial cross-sectional view through rotor shaft 36 showing bladed rotor 16 and vanes 22 of any one or power plants 10, 110, 210. Power plants 10, 110, 210 may include one or more pitch actuators 60 operatively connected to rotor blades 18 and/or to vanes 22. In embodiments where rotor blades 18 have a variable pitch, pitch actuator 60 may be operable to cause rotor blades 18 to rotate about their respective blade axes BA as shown by arrow P1. In embodiments where vanes 22 have a variable pitch, pitch actuator 60 may be operable to cause vanes 22 to rotate about their respective vane axes VA as shown by arrow P2. Pitch actuator(s) 60 may be hydraulically driven (e.g., include a hydraulic cylinder) or ballscrew driven. Pitch actuator(s) 60 may be integrated with vane shaft 44 and operatively connected to vanes 22.

In some embodiments, vane shaft 44 may include flange 62 serving as a mounting interface for securing (e.g., fastening) vanes 22 thereto. In some embodiments, vanes 22 may be pivotally secured to flange 62 so as to permit rotation of vanes 22 about their respective vane axes VA. In some embodiments, vanes 22 may be pivotally mounted to vane shaft 44 with hydraulic pressure being delivered through hollow vane shaft 44 for actuation of vanes 22. Vane shaft 44 may be fixedly secured to non-rotating structure 48 so as to be non-rotatable about rotor axis RA.

FIG. 5A is an enlarged axial cross-sectional view of rotor shaft 36 of any one or power plants 10, 110, 210. In some embodiments, rotor shaft 36 may include flange 64 serving as a mounting interface for securing (e.g., fastening) bladed rotor 16 thereto. In some embodiments, hub 20 (shown in FIG. 1) may be mounted to flange 64 so as to be rotatable with rotor shaft 36. Rotor blades 18 may be pivotally secured to flange 64 so as to permit rotation of rotor blades 18 about their respective blade axes BA.

Rotor shaft 36 may be rotatably supported by way of one or more bearings 66 fixedly secured to non-rotating structure 48 so as to be rotatable about rotor axis RA. During propulsion of aircraft 28, 128, 228, the rotation of bladed rotor 16 arranged in the pusher configuration may exert a forward force axially along rotor shaft 36 and such forward force may be transferred to airframe 30 to propel aircraft 28, 128, 228. Bearing(s) 66 may include a thrust bearing configured to transfer the forward (i.e., thrust) force exerted by bladed rotor 16 along rotor shaft 36 to non-rotating structure 48. Arrows C are used in FIG. 5 to illustrate an axially compressive load being applied to the portion of rotor shaft 36 that is disposed axially between bearing 66 and flange 64 during propulsion of aircraft 28, 128, 228 by way of rotation of bladed rotor 16 in direction R.

Figure 6:
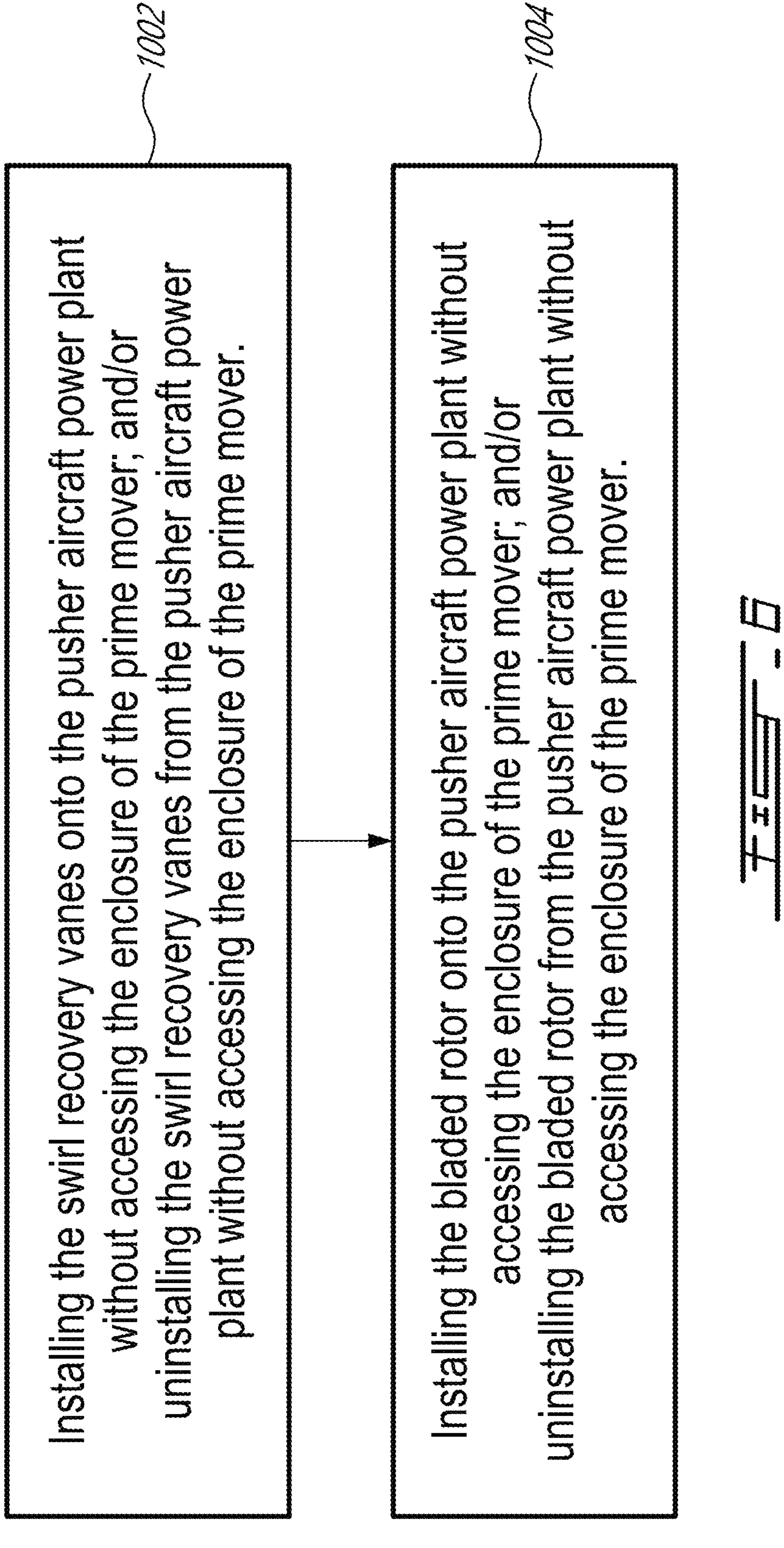
FIG. 6 is a flow diagram of a method of servicing a pusher aircraft power plant.

FIG. 6 is a flow diagram of method 1000 of servicing (i.e., maintaining) a pusher aircraft power plant. Method 1000 may be performed on any one of power plants 10, 110, 210, or on another aircraft power plant having a pusher configuration. Method 1000 may include elements of any one of power plants 10, 110, 210. Method 1000 may include other actions disclosed herein. Method 1000 may be used to service power plant 10, 110, 210 having one or more prime movers 12, 112, 212, enclosure 14, 114, 214 housing at least part of prime mover(s) 12, 112, 212, bladed rotor 16 drivingly coupled to prime mover(s) 12, 112, 212 and disposed aft of prime mover (s) 12, 112, 212, and a plurality of vanes 22 disposed aft of bladed rotor 16 to interact with a flow of air exiting bladed rotor 16 during rotation of bladed rotor 16. In various embodiments, method 1000 may include: uninstalling vanes 22 from power plant 10, 110, 210 and/or installing vanes 22 onto power plant 10, 110, 210 without accessing enclosure 14, 114, 214 (block 1002); and/or uninstalling bladed rotor 16 from power plant 10, 110, 210 and/or installing bladed rotor 16 onto power plant 10, 110, 210 without accessing enclosure 14, 114, 214 (block 1004).

The configurations of power plants 10, 110, 210 may facilitate servicing by facilitating the removal, installation and/or replacement of vanes 22 as a LRU. In other words, the removal, installation and/or replacement of vanes 22 may be performed relatively quickly without requiring extensive disassembly of the remainder of power plant 10, 110, 210. This means that aircraft 28, 128, 228 may quickly return to service while the LRU is being tested and/or repaired. For example, the configuration of the vanes 22 herein may facilitate the removal or installation of vanes 22 without needing to access enclosure 14, 114, 214 of prime mover 12, 112, 212 of power plant 10, 110, 210.

In embodiments where prime mover 12 is a combustion engine, enclosure 14 may include a housing or casing of such combustion engine and the installation and/or removal of one or more vanes 22 onto/from power plants 10, 110, 210 may be performed without having to access or dismantle such enclosure 14, 114, 214. In some embodiments, bladed rotor 16 may also be installed or removed onto/from power plants 10, 110, 210 without having to access or dismantle such enclosure 14, 114, 214.

Figure 7:
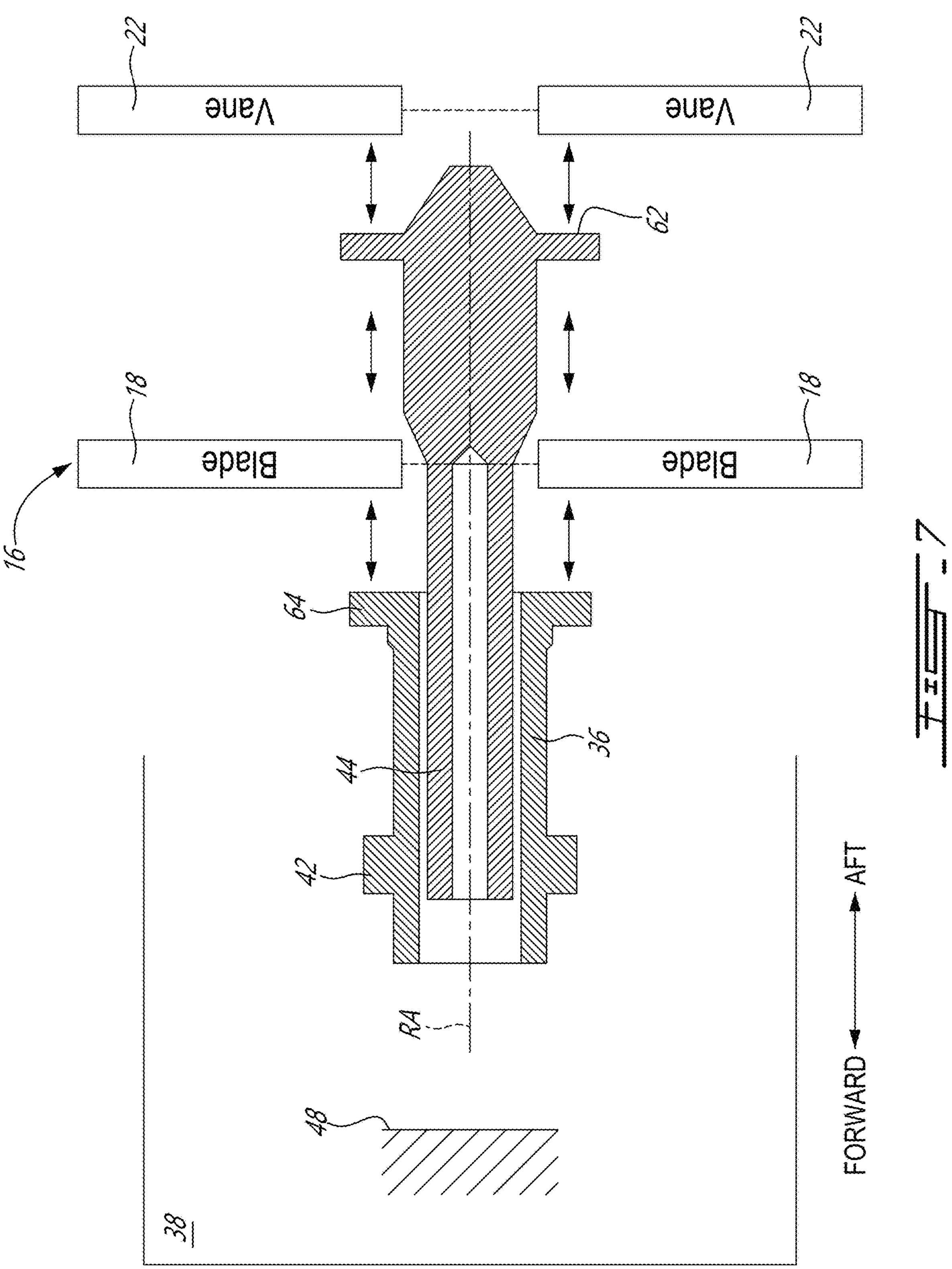
FIG. 7 is an exploded schematic cross-sectional view showing a disassembly of the bladed rotor and the swirl recovery vanes from the pusher aircraft power plant.

FIG. 7 is an exploded schematic view of bladed rotor 16 and vanes 22 of any one of power plants 10, 110, 210 illustrating a removal and/or installation of bladed rotor 16 and of vanes 22 from power plant 10, 110, 210. For example, the removal of vane(s) 22 may include the disassembly (e.g., unfastening) of vane(s) 22 from (e.g., flange 62 of) vane shaft 44. The installation of replacement vane(s) 22 may include the fastening of vane(s) 22 to (e.g., flange 62 of) vane shaft 44. Since the mounting interface between vane(s) 22 and vane shaft 44 is disposed aft and outside of enclosure 14, 114, 214, the removal and/or installation of vane(s) 22 may not require accessing the interior of enclosure 14, 114, 214 and/or dismantling any part of enclosure 14, 114, 214. In embodiments where vanes 22 have a variable pitch, the removal and/or installation of vane(s) 22 may include the disconnection/connection of vane(s) 22 from/to pitch actuator(s) 60.

The removal of vane shaft 44 may include the disassembly (e.g., unfastening) of vane shaft 44 from non-rotating structure 48. Vane shaft 44 may then be slid axially in the aft direction and withdrawn from the central passage of rotor shaft 36. The installation of vane shaft 44 may include the fastening of vane shaft 44 to non-rotating structure 48. The installation and/or remove of vane shaft 44 may require accessing the interior of gearbox 38 in some embodiments. However, since the mounting interface between vane shaft 44 and non-rotating structure 48 is disposed aft and outside of enclosure 14, 114, 214, the removal and/or installation of vane shaft 44 may not require accessing the interior of enclosure 14, 114, 214 and/or dismantling any part of enclosure 14, 114, 214.

The removal of bladed rotor 16 may include the disassembly (e.g., unfastening) of bladed rotor 16 from (e.g., flange 64 of) rotor shaft 36. The installation of bladed rotor 16 may include the fastening of bladed rotor 16 to (e.g., flange 64 of) rotor shaft 36. Since the mounting interface between bladed rotor 16 and rotor shaft 36 is disposed aft and outside of enclosure 14, 114, 214, the removal and/or installation of bladed rotor 16 may not require accessing the interior of enclosure 14, 114, 214 and/or dismantling any part of enclosure 14, 114, 214. In embodiments where bladed rotor 16 has rotor blades 18 of variable pitch, the removal and/or installation of bladed rotor 16 may include the disconnection/connection of rotor blades 18 from/to pitch actuator(s) 60.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A pusher aircraft power plant for propelling an aircraft, the pusher aircraft power plant comprising:

a prime mover operable to generate motive power;

an enclosure housing at least part of the prime mover;

a bladed rotor drivingly coupled to the prime mover and disposed aft of the prime mover relative to a direction of propulsion of the pusher aircraft power plant; and a plurality of vanes angularly distributed about a rotation axis of the bladed rotor and being non-rotatable about the rotation axis of the bladed rotor, the vanes being disposed aft of the bladed rotor to interact with a flow of air propelled by the bladed rotor during rotation of the bladed rotor, the vanes being disposed aft of the enclosure housing at least part of the prime mover, wherein:

the bladed rotor is mounted to a hollow rotor shaft rotatable about the rotation axis of the bladed rotor;

the bladed rotor is drivingly coupled to the prime mover via the hollow rotor shaft; and the vanes are mounted to a non-rotatable vane shaft that extends into the hollow rotor shaft.

2. The pusher aircraft power plant as defined in claim 1, wherein the enclosure includes a nacelle and the vanes are disposed aft of the nacelle.

3. The pusher aircraft power plant as defined in claim 1, wherein:

the prime mover includes a combustion engine having an exhaust gas outlet; and the vanes are disposed aft of the exhaust gas outlet.

4. The pusher aircraft power plant as defined in claim 1, wherein:

the prime mover includes one or more turbines; and the bladed rotor is disposed aft of all of the one or more turbines.

5. The pusher aircraft power plant as defined in claim 1, wherein:

the prime mover is drivingly connected to an output shaft for delivering the motive power to the bladed rotor; and the output shaft has an aft end that is disposed outside and aft of the enclosure of the prime mover.

6. The pusher aircraft power plant as defined in claim 5, wherein:

the bladed rotor is mounted to a rotor shaft rotatable about the rotation axis of the bladed rotor; and the output shaft and the rotor shaft are non-coaxial.

7. The pusher aircraft power plant as defined in claim 6, wherein the rotor shaft is radially offset from the output shaft.

8. The pusher aircraft power plant as defined in claim 7, wherein the rotor shaft is drivingly coupled to the output shaft via gears housed inside a gearbox.

9. The pusher aircraft power plant as defined in claim 1, wherein:

the hollow rotor shaft is drivingly coupled to the prime mover via gears housed inside a gearbox; and the non-rotatable vane shaft is fixedly secured to a non-rotating structure inside of the gearbox.

10. The pusher aircraft power plant as defined in claim 1, wherein the bladed rotor and the vanes are open.

11. The pusher aircraft power plant as defined in claim 1, wherein the vanes have a variable pitch.

12. The pusher aircraft power plant as defined in claim 1, wherein the prime mover includes a Wankel engine.

13. The pusher aircraft power plant as defined in claim 1, wherein:

the prime mover includes a gas turbine engine having a turbine section; and the vanes are disposed aft of the turbine section.

14. A pusher aircraft power plant for propelling an aircraft, the pusher aircraft power plant comprising:

a combustion engine operable to generate motive power, the combustion engine having a housing;

a bladed rotor for propelling the aircraft, the bladed rotor being drivingly coupled to the combustion engine and disposed aft of the housing of the combustion engine relative to a direction of propulsion of the pusher aircraft power plant; and a circular array of swirl-recovery vanes coaxial with a rotation axis of the bladed rotor and non-rotatable about the rotation axis of the bladed rotor, the swirl-recovery vanes being disposed aft of the bladed rotor to interact with a flow of air exiting the bladed rotor during rotation of the bladed rotor, wherein:

the combustion engine has an output shaft;

the bladed rotor is mounted to a hollow rotor shaft rotatable about the rotation axis of the bladed rotor;

the hollow rotor shaft is radially offset from the output shaft; and the swirl-recovery vanes are mounted to a non-rotatable vane shaft that extends through the hollow rotor shaft and that is fixedly secured at a location that is forward of the hollow rotor shaft.

15. The pusher aircraft power plant as defined in claim 14, wherein the combustion engine is a Wankel engine.

* * * * *